United States Patent Office 2,995,457
Patented Aug. 8, 1961

2,995,457
SOIL STABILIZATION
John W. Lyons, Webster Groves, and William F. Tucker, Creve Coeur, Mo., assignors to Monsanto Chemical Company, St. Louis, Mo., a corporation of Delaware
No Drawing. Filed June 24, 1958, Ser. No. 744,081
12 Claims. (Cl. 106—287)

This invention relates to novel improved procedures for the stabilization of soils and to the novel soil compositions prepared thereby. More specifically this invention relates to an improved procedure for substantially improving the structural properties of clay soils whereby the said soils are treated with a minor amount of a fluorophosphoric acid such that they can be employed as a suitable base material for various construction projects.

Soils containing substantial quantities of clay are presenting an ever increasing problem to construction engineers, especially in the building of modern highways and the construction of airfields capable of adequately handling present heavy aircraft. It is well known that clay soils may have a high compressive strength when dry but that generally they have substantially no strength when wet. Accordingly, past practice initially largely avoided the problem by laying out highways and airfields in areas that did not possess problem soils and when it became necessary to go into these areas the practice generally required hauling in gravel and crushed stone in substantial quantities to provide a suitable subgrade. The present and foreseeable future materially increased wheel loads of truck transports and aircraft; the increasing unavailability of select sites having suitable construction and foundation soils particularly in the more populated areas, excluding the prohibitively expensive procedures of taking occupied land; the fact that modern highways are designed to provide the shortest reasonable distance between the principal cities such that they no longer can entirely circumvent the areas of problem soils; and the dwindling supply of economically available granular soils, crushed stone and gravel in many areas, when considered in the light of the vast construction program which is planned clearly indicate the seriousness of this problem.

Various chemicals have been suggested and employed for the purpose of improving the bearing load of soils, for example Portland cement, lime, calcium chloride, sodium silicate, various bituminous materials, aniline-furfural resins, calcium acrylate resins, and the like. Normally the chemicals are added in relatively large amounts, thus the various inorganic materials frequently require the addition of 10 percent or more, based on the dry weight of the soil. Whereas Portland cement problably has been used more widely and with greater success than any other soil stabilization material and is usually employed at from about 10 to about 15 percent by weight of the dry soil, it is not recommended for highly plastic soils. Thus, soils having a plastic index of more than about 16 to 18, wherein the plastic index expresses the range of moisture content over which the soil is plastic and is defined as the moisture content at the liquid limit minus the moisture content at the lower plastic limit, are generally not satisfactorily stabilized in the field with cement.

The principal object of this invention is to provide a means of substantially improving the wet structural strength of clay-containing soils. Another object of this invention is to treat clay-containing soils having a plastic index of greater than about 15 to provide a soil composition suitable as subgrade for the construction of highways, airfields, and the like. Still another object of this invention is to provide an economical process which is adapted to rapid construction procedures in civilian and military survice. Other objects will be apparent from the following disclosure.

It has now been found that the addition to a clay-containing soil of from about 0.5 to about 5 percent and preferably from about 1 to about 3 percent of a fluorophosphoric acid, based on the dry weight of said soil effects a material improvement in the wet compressive strength of the soil and with suitable working procedures provides a subgrade soil which is satisfactory for the support of highway construction, airfield construction and the like.

The fluorophosphoric acids of this invention are compounds of the structure

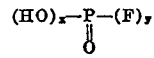

wherein $x$ and $y$ are unlike whole numbers from 1 to 2 and includes monofluorophosphoric acid, i.e. $H_2PO_3F$, and difluorophosphoric acid, i.e. $HPO_2F_2$, and various mixtures thereof. These materials are well known and can be prepared by a wide variety of methods. For example, U.S. 2,408,784 describes the preparation of anhydrous monofluorophosphoric acid from equimolar amounts of anhydrous metaphosphoric acid and anhydrous hydrofluoric acid. The preparation of anhydrous monofluorophosphoric acid and anhydrous difluorophosphoric acid respectively as well as mixtures thereof from phosphorus pentoxide and hydrofluoric acid is described in U.S. 2,408,785. Mixtures of mono- and difluorophosphoric acids can also be obtained from hydrofluoric acid and ortho phosphoric acid, for example an equimolar mixture of anhydrous hydrofluoric acid and anhydrous ortho phosphoric acid provides a mixture containing 60% $H_2PO_3F$, 7% $HPO_2F_2$ and 33% $H_3PO_4$. Difluorophosphoric acid can also be prepared by mixing phosphorus oxyfluoride with cold water or with monofluorophosphoric acid.

The clay-containing soils which may be benefited by the fluorophosphoric acid treatment preferably include those soil compositions containing from about 10 to about 70 percent clay, and more preferably a silty-clay soil containing from about 20 to about 50 percent clay and from about 25 to 75% silt in accordance with the well known triaxial textural classification chart of the U.S. Bureau of Chemistry and Soils. These soils include the various soils classified as clay, sandy clay, silty clay, clay loam, sandy clay loam, and silty clay loam. Various illustrative specific clay-containing soils are for example clay from the Hybla Valley, Virginia, Cecil clay, Houston clay, Lake Charles clay, Capay silty clay loam, and the like.

The fluorophosphoric acid treatment of the clay-containing soil can be readily effected by the addition of a calculated amount, depending on the depth of soil treated and the moisture content of said soil, of the fluorophosphoric acid by spray application by a P and H Single-Pass Soil Stabilizer, Seaman Pulvi-Mixer, or similar apparatus, or by application of the fluorophosphoric acid by other suitable means and mixing with various traveling pug mills, rototillers and the like. The fluorophosphoric acid can be diluted with water if desired in suitable storage tanks at the construction site; can be partially diluted to a desired concentration and subsequently further diluted just prior to application to the soil, for example where two traveling tanks are employed and the concentration of the acid is controlled by independent regulating valves into a distribution system whereby the final ratio of fluorophosphoric acid and water can be readily controlled as necessary; or the water and fluorophosphoric acid can be added to the soil from separate independently controlled spray systems; and other suitable procedures as will be apparent to those skilled in the art. The treatment of the soil with a diluted system also provides the further advantage of effecting a more uniform distribution of the fluorophosphoric acid in the soil for a given degree of mixing in contradistinction to the prior art systems which require the initial intimate distribution of solid material therein. Normally it is desirable to treat the soil to a compacted depth of at least about 6 inches to provide a well stabilized subgrade. After the treatment of the clay-containing soil with the desired amount of fluorophosphoric acid it is compacted by the application of a sheep's-foot roller and thereafter leveled and further compacted by pneumatic-tired rollers and then with smooth rollers if desired. Thereafter the treated soil is generally covered with a light coating of bituminous material by spray application or other suitable means to prevent substantial loss of moisture therefrom during curing. Then a suitable subbase and topping can be applied thereover or the topping can be applied directly to the stabilized subgrade as desired. When the combination of subbase and topping is applied the use of this invention to provide a stabilized subgrade effects a substantial saving in the quantity of subbase material which might otherwise be required, for example in one application calling for a 22-inch subbase, based on the California bearing ratio procedure, the preparation of a subgrade in accordance with this invention enables the reduction of the subbase to 6 inches or less.

It is generally recognized that a stabilized soil preferably should exhibit an unconfined compressive strength of at least about 100 pounds per square inch after immersion of the compacted soil in water for a time of two days and that a stabilized soil preferably should not expand, after immersion, by more than about 2.5 percent of its initial compacted volume.

The molded 2-inch by 4-inch cylindrical samples for the unconfined compressive strength evaluation were prepared with a Vicksburg compactor, which device was developed by the U.S. Waterways Experiment Station, Vicksburg, Mississippi, and modified as hereinafter described. The apparatus consists of a compaction hammer, compaction mold, base plate, and an Ames dial supported on a tripod. The hammer is a four-pound weight which slides freely on a steel rod between an upper handle and a compaction foot at the bottom. The space between handle and foot is such that the hammer has a free fall of exactly twelve inches. The compaction foot has a flat circular face with a diameter just slightly less than the inside diameter of the mold. The mold is about six inches in height and exactly two inches in inside diameter. Two "ears" are welded to the outside which fit over upright posts on the base plate. The base plate has a short piston fastened to it which projects upward about ¾ inch into the mold. After several blows were delivered to the soil in the mold a small wedge was removed so that the mold rides free supported by the friction of the compacted soil against the walls of the mold. With succeeding hammer blows a compactive effort is exerted by the lower piston on which the soil is resting. After compaction the tripod and Ames dial were placed in position so that an extension from the dial rests on top of the soil in the mold. Height can then be read to 0.001 inch on the dial indicator. To remove the compacted sample a 10-ton capacity Carver Press was equipped with a collar which just clears the compaction mold of the Vicksburg compactor but does not clear the "ears" on the mold. By means of this collar and a ram which just fits inside of the mold, samples were readily ejected after compaction.

The molded samples mentioned in the examples given below were prepared using the above-described Vicksburg compactor in the following manner, unless otherwise specified. The desired mixture of soil, water and fluorophosphoric acid was prepared and the necessary quantity thereof to provide compact specimens about 4±0.1 inches in height was weighed out and compacted in four roughly equal layers, each layer receiving a fixed number of blows from the four-pound hammer falling through a vertical distance of twelve inches. After the first few blows on the first layer, the metal wedge under the mold was removed, thus allowing the piston in the base plate to exert a compactive effort on the bottom of the soil with each succeeding blow. Another portion of the soil mixture was employed to determine the moisture content of the sample (total volatiles at 110° C. for 16 hours). The compacted sample was then ejected and cured at about 68 to about 70° F. and about 100 percent relative humidity for five days and then immersed in water at about 68 to 70° F. for a period of two days.

The unconfined compressive strength was determined using an electrically driven AP-170 Stability Compression Testing Machine wherein the loading rate was 0.25 inch per minute. A brass plate exactly two inches in diameter was placed on the top of the soil specimens, a ball bearing placed in a depression in the upper surface of the plate and the machine put into operation. The load was uniformly applied and the maximum stress before failure of the test sample, measured in pounds per square inch, was noted.

The method of determining volume change was essentially that procedure published in Procedures for Testing Soils, ASTM Committee D-18 (July 1950), pp. 131–135 as submitted by the Bureau of Public Roads. It was found that when a clay soil was treated with 2 and 3 percent of fluorophosphoric acid at soil moisture contents of from about 16 to about 20 percent at the time of compaction and the molded samples were cured at about 70° F. and 100 percent relative humidity for one day prior to immersion that the percent volume change after soaking in water for 140 hours varied from 0.6 to 1.5. These values indicate that the clay fluorophosphoric acid compositions are well below the maximum permissible expansion limit set out hereinabove.

The silty clay loam, B.P.R. Class A-6, from Louisiana used for the following experiments is composed of about 25% clay, 58% silt, and 17% sand. This clay was found to have a plastic index of about 19, an optimum moisture for compaction of about 18%, a maximum dry density of about 107.2 pounds per cubic foot, the volume changed when saturated was 4%, and the unconfined compressive strength after 5 days cure at about 68–70° C. and about 100% relative humidity and 2 days of soaking in water of 5 pounds per square inch.

The following examples are illustrative but not limitative of the instant invention.

*Example 1*

A series of unconfined compressive strength test samples was prepared by placing a quantity of clay soil into a mixer and mixing varying amounts of monofluorophosphoric acid, based on 100% $FH_2PO_3$ and the weight of the dry soil, and water thereto. Also a series of unconfined compressive strength test samples was prepared by placing a quantity of the same clay soil into a mixer and mixing varying amounts of ortho phosphoric acid based on 100% $H_3PO_4$ and the weight of the dry soil, and water thereto. The respective molded test samples were cured for 5 days and then immersed in water for 2 days prior to the determination of their unconfined compressive strength, the results of which are given in the following table:

| Sample | Percent Water in Molded Soil | Dry Density, lbs./ft.³ | Unconfined Compressive Strength, p.s.i. |
|---|---|---|---|
| Control | 19.1 | 107.2 | 5 |
| 1% FH₂PO₃ | 16.3 | 106.3 | 28 |
| 2% FH₂PO₃ | 18.4 | 103.6 | 56 |
| 3% FH₂PO₃ | 16.4 | 99.1 | 63 |
| 4% FH₂PO₃ | 16.4 | 102.0 | 151 |
| 2% H₃PO₄ | 17.4 | 104.3 | 32 |
| 4% H₃PO₄ | 17.6 | 109.8 | 86 |

As aforenoted either monofluorophosphoric acid or difluorophosphoric acid per se or various mixtures thereof can be added to the clay-containing soil directly or in admixture with water and then intimately mixed with the soil. The fluorophosphoric acids of this invention can be employed in the presence of other soil additives which additives may be present in minor amounts in the soil or added to the soil after treatment thereof with the fluorophosphoric acid. A particularly useful mixture for soil stabilization purposes is that containing a fluorophosphoric acid of this invention and anhydrous ortho phosphoric acid wherein the weight of the latter does not exceed 50 weight percent of the total fluorophosphoric acid content. Such a composition is readily obtained by reacting anhydrous hydrofluoric acid and anhydrous ortho phosphoric acid, e.g. in equimolar proportions these reactants provide a composition containing 63% $H_2PO_3F$, 7% $HPO_2F_2$ and 30% $H_3PO_4$.

The instant invention also affords a means of providing building blocks for the construction of earth buildings and the like such as are commonly erected in Asia, Africa and South America, and particularly in areas where soil is about the only locally available building material, as for example Egypt and Israel. The building blocks can be easily produced by unskilled labor in the undeveloped portions of these areas by mixing the proper ratio of clay soil, fluorophosphoric acid and water and compacting said mixture to approach the maximum density thereof. As indicated above the compacted treated soil has a high compressive strength even on immersion in water and will accordingly withstand rain and flood water without disintegrating as do the untreated soils.

While this invention has been described with respect to certain embodiments it is not so limited and it is to be understood that variation and modification thereof obvious to those skilled in the art can be made without departing from the spirit or scope of this invention.

What is claimed is:

1. A method of increasing the stability of clay-containing soils containing from about 10 to about 70% of clay, which method comprises (a) the addition thereto of from about 0.5 to about 5 weight percent of a fluorophosphoric acid of the structure

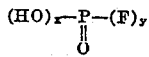

wherein $x$ and $y$ are unlike whole numbers from 1 to 2, said weight percent of fluorophosphoric acid being based on the dry weight of said soil, (b) effecting a substantially uniform distribution of the fluorophosphoric acid in the said soil and (c) thereafter compacting the treated soil, thereby resulting in a substantially improved unconfined compressive strength over the untreated soil after immersion in water for at least two days.

2. The method of claim 1 wherein the fluorophosphoric acid is monofluorophosphoric acid, $H_2PO_3F$.

3. The method of claim 2 wherein 1 to 3 percent of monofluorophosphoric acid is employed.

4. A method of effecting the stabilization of clay-containing soils containing from about 10 to about 70 percent of clay comprising the addition thereto of from about 0.5 to about 5 weight percent of a fluorophosphoric acid of the structure

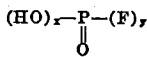

wherein $x$ and $y$ are unlike whole numbers from 1 to 2, based on the dry weight of said soil, effecting a substantially uniform distribution of the fluorophosphoric acid in the said soil and thereafter compacting the treated soil to provide a stabilized soil characterized by a substantial improved unconfined compressive strength over the untreated soil after immersion in water for at least two days.

5. The method of claim 4 wherein the fluorophosphoric acid is monofluorophosphoric acid, $H_2PO_3F$.

6. A method of effecting the stabilization of clay-containing soils containing from about 20 to about 50 percent of clay and having a silt content in the range of about 25 to 75 percent comprising the addition thereto of from about 0.5 to about 5 weight percent of a fluorophosphoric acid of the structure

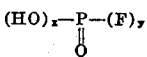

wherein $x$ and $y$ are unlike whole numbers from 1 to 2, based on the dry weight of said soil, effecting a substantially uniform distribution of the fluorophosphoric acid in the said soil and thereafter compacting the treated soil to provide a stabilized soil characterized by a substantial improved unconfined compressive strength over the untreated soil after immersion in water for at least two days.

7. The method of claim 6 wherein the fluorophosphoric acid is monofluorophosphoric acid, $H_2PO_3F$.

8. The method of claim 7 wherein 1 to 3 percent of monofluorophosphoric acid is employed.

9. A composition of matter comprising a compacted composition of a clay soil containing from about 10 to about 70% of clay and having substantially uniformly distributed throughout said soil from about 0.5 to about 5 weight percent of a fluorophosphoric acid of the structure

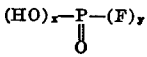

wherein $x$ and $y$ are unlike whole numbers from 1 to 2, based on the dry weight of said soil.

10. The composition of matter of claim 9 wherein the soil is a silty-clay soil and contains from about 20 to about 50 percent of clay and from about 25 to 75 percent silt.

11. A composition of matter comprising a compacted composition of a clay-containing soil having a silt content in the range of about 25 to 75 percent and a clay content of from about 20 to about 50 percent having substantially uniformly added thereto from about 1 to about 3 percent of monofluorophosphoric acid based on the dry weight of the said soil.

12. A composition of matter comprising a compacted composition of a clay-containing soil having a silt content in the range of about 25 to 75 percent and a clay content of from about 20 to about 50 percent having substantially uniformly added thereto from about 1 to about 3 percent of monofluorophosphoric acid based on the dry weight of the said soil and ortho phosphoric acid in an amount not exceeding 50 percent by weight of the said monofluorophosphoric acid.

References Cited in the file of this patent

UNITED STATES PATENTS

| | | |
|---|---|---|
| 2,212,574 | Roth | Aug. 27, 1940 |
| 2,664,398 | Bond | Dec. 29, 1953 |